(12) United States Patent
Watson

(10) Patent No.: US 9,101,116 B1
(45) Date of Patent: Aug. 11, 2015

(54) AWNING DEVICE FOR BEE HIVE

(76) Inventor: James L. Watson, Hingham, MA (US)

( * ) Notice: Subject to any disclaimer, the term of this patent is extended or adjusted under 35 U.S.C. 154(b) by 628 days.

(21) Appl. No.: 12/760,093

(22) Filed: Apr. 14, 2010

Related U.S. Application Data

(60) Provisional application No. 61/169,106, filed on Apr. 14, 2009.

(51) Int. Cl.
*A01K 47/06* (2006.01)
*A01K 47/00* (2006.01)

(52) U.S. Cl.
CPC ............... *A01K 47/06* (2013.01); *A01K 47/00* (2013.01)

(58) Field of Classification Search
CPC ........ A01K 47/06; A01K 47/00; E04F 10/10; E04F 10/08; E04F 10/005; E04F 10/02; E04F 10/0662; E04F 10/00; E04H 15/58; E04H 6/025; B60J 3/005
USPC ........ 449/3, 13–15, 25; 49/71; 52/74; D25/57
See application file for complete search history.

(56) References Cited

U.S. PATENT DOCUMENTS

| | | | | |
|---|---|---|---|---|
| 205,339 A | * | 6/1878 | Barnes | 449/13 |
| 207,731 A | * | 9/1878 | Gale | 449/13 |
| 218,097 A | * | 7/1879 | Weyer et al. | 449/9 |
| 1,387,734 A | | 8/1921 | Nitsch | |
| 1,470,112 A | | 11/1923 | Cottam | |
| 1,523,318 A | * | 1/1925 | Utton | 449/14 |
| 1,584,775 A | * | 5/1926 | Jonian | 449/13 |
| 2,323,805 A | * | 7/1943 | Dzula | 449/15 |
| 2,657,089 A | * | 10/1953 | Kaul | 296/152 |
| 2,690,599 A | * | 10/1954 | Thompson et al. | 52/73 |
| 2,709,820 A | * | 6/1955 | Wahl | 449/14 |
| 2,895,185 A | * | 7/1959 | Preaus | 52/76 |
| 4,257,133 A | * | 3/1981 | Steinrucken | 449/12 |
| 4,402,099 A | * | 9/1983 | Platt, Jr. | 449/30 |
| 4,958,652 A | * | 9/1990 | Maya | 135/87 |
| 5,019,011 A | | 5/1991 | Williams | |
| 7,632,167 B1 | * | 12/2009 | Miller | 449/15 |

* cited by examiner

*Primary Examiner* — Kathleen Alker

(57) ABSTRACT

An awning device to cover the maximum area of a bee hive entrance that is easy to install comprising a rectangular sheet of a flexible material attached to the front and sides of a hive body whereby bee mortality is reduced during spring and summer rains. A further modification of the awning device so that it can be made to encompass the entire hive.

3 Claims, 1 Drawing Sheet

AWNING DEVICE FOR BEE HIVE

CROSS-REFERENCE TO RELATED APPLICATIONS

This application claims the benefit of provisional patent application Ser. No. 61/169,106, filed 2009 Apr. 14 by the present inventor.

FEDERALLY SPONSORED RESEARCH

Not Applicable

SEQUENCE LISTING OR PROGRAM

Not Applicable

BACKGROUND

1. Field of Invention
This invention relates to awning device for bee hives.
2. Prior Art
Beekeepers have in the past used covering devices for the entrance of bee hives for a variety of purposes as U.S. Pat. No. 1,387,734 to Nitsch and Meier, U.S. Pat. No. 1,470,112 to Cottam, and U.S. Pat. No. 5,019,011 to Williams illustrate. All of these applications were complex and presumably expensive to manufacture. While their utility may have been beneficial none were designed solely with the protection of the front of the hive entrance from inclement weather. Presently a great number of bee hive are unprotected from the effects of wind, rain, and snow for the lack of an inexpensive awning device.

Accordingly, an object of the present invention is to provide an inexpensive awning device that is simple of manufacture and easy to install.

It is a further object of the present invention to provide an awning device of a proportion to encompass a greater portion of the front entrance so that during early spring build up of the bee population when bees tend to "beard up" or cover the entire front outside portion of a hive for lack of space inside, they may be protected from sudden spring showers.

It is a further object of the present invention to provide an awning device that will protect from snow blocking the entrance of the bee hive during winter.

SUMMARY

In accordance with one embodiment an awning device comprising of a rectangular sheet of flexible material attached to a hive body so as to provide the maximum protection of the front hive body entrance.

DRAWINGS

Figures

DRAWINGS

Figure 1:
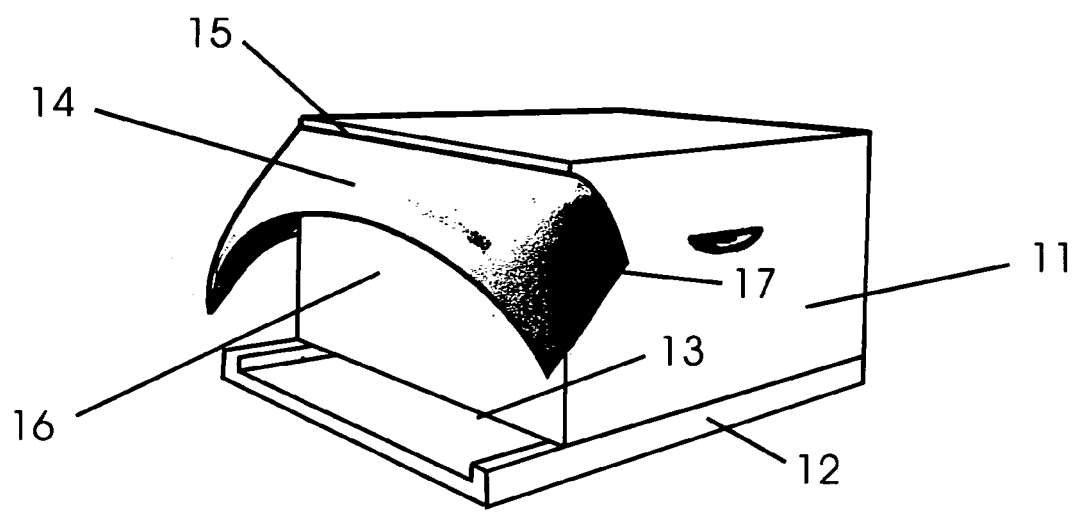
FIG. 1 shows an awning device situated on a typical hive body in accordance with one embodiment.

Reference Numerals 11 hive body
12 bottom board
13 hive entrance
14 awning device
15 top lateral edge
16 upper front margin hive body
17 side of awning
18 top fold junction
19 top lateral crease
20 transverse crease
21 front lateral edge
22 front corner

DETAILED DESCRIPTION

FIG. 1

Preferred Embodiment

FIG. 1 is a perspective view of a hive body 11 and bottom board 12 which comprises the hive entrance 13 of standard beehive. In the preferred embodiment the awning device 14 is a protective cover for the hive entrance 13 formed by attaching a rectangular sheet of flexible material with a length that exceeds the face width of a common hive body by approximately two (2) inches on each side and with a width of approximately eight (8) inches, that is fastened centrally along its top lateral edge 15 to the top portion of the upper front margin of the hive body front 16 with the sides of the awning 17 being formed by folding and attaching the remaining sides of the upper lateral areas to a position lower on the sides of the hive body in such a way that they form triangular supports for the remaining portion of the rectangular sheet which is thereby projected outward to form the awning shape of the protective cover. In the simplest embodiment the rectangular sheet of flexible material is comprised of foam plastic and may be additionally laminated for more durability.

FIG. 2

Additional Embodiment

The use of a heavier material of sheet plastic or metal can be facilitated by making a cut at each of the two fold junctions 18 and 23 so that a top lateral crease 19 can be formed to allow bending along the length of the upper lateral edge to the depth of the cut. This allows for both easier positioning of the device on the face of the hive body and the use of a heavier material. Additionally a transverse crease 20 and 24 may be made from each fold junction 18 and 23 to the front lateral edge 21 of the awning device.

Operation—FIG. 1

In operation one uses the awning as illustrated in FIG. 1 by attaching a rectangular piece of semi rigid polyethylene plastic air foam of the kind that is used for packaging of the approximate dimensions of eight (8) by twenty four (24) inches by one quarter inch thick to the front top upper portion of the hive body above the entrance of the hive by means of staples placed along the upper portion of the centered rectangular sheet. Five staples should be sufficient. Next the front edge is lifted up and both the remaining upper corners of the rectangular sheet are attached to the upper front portions of the side panels of the hive body by the use of a minimum of three staples for each side. Thusly attached the front portion of the rectangular sheet is projected outward to provide the awning shape for the protection of the hive entrance from rain and snow. If an accumulation of snow occurs then the weight of the snow deforms the structure to the extent that the snow readily falls off.

Figure 2:
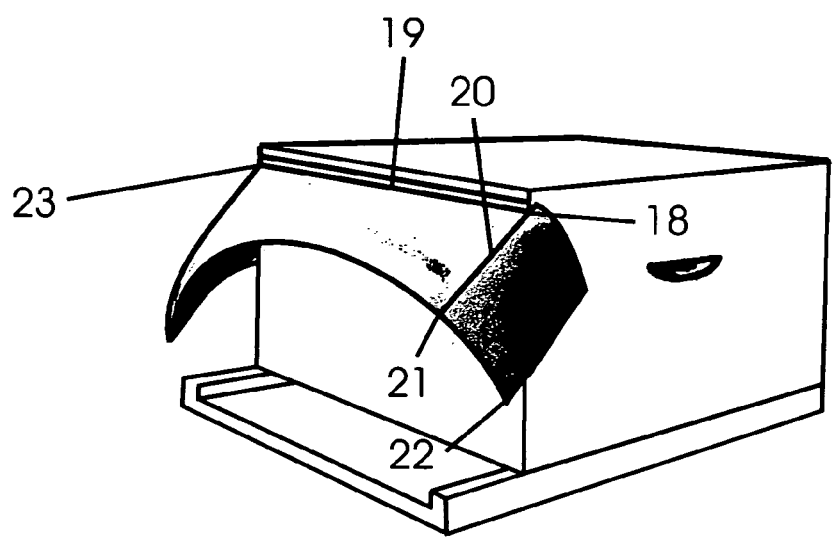
FIG. 2 shows a similar awning device situated on a typical hive body in accordance with an another embodiment.

Operation—FIG. 2

The rectangular sheet may be composed of a more rigid material such as sheet plastic of a thickness of 1 to 2 millimeters and the attachment can be facilitated by introducing a crease along the upper portion of the rectangular sheet by notching to a depth of approximately one half an inch at the junction points of the fold and scoring and bending along the length of the middle portion to a depth of one half an inch. Additionally if an angular appearance is desired for the sides of the awning shape then additional creases may be made from the junction points 18 to the front of the rectangular sheet.

CONCLUSION, RAMIFICATIONS, AND SCOPE

Accordingly the reader will see that, according to one embodiment of the invention, I have provided an inexpensive awning device that is simple of manufacture and easy to install and covers the maximum area as protection for the bee hive entrance thereby reducing honey bee mortality during early spring and summer rains. Additionally in another embodiment I have provided an awning device that will encompass the entire parameter of a bee hive and thereby offer protection for the entire outside of the hive.

While the above description contains many specificities, these should not be construed as limitations on the scope of any embodiment, but as exemplifications of the presently preferred embodiment thereof. Many other ramifications and variations are possible within the teachings of the various embodiments. For example, the awning device when made of stiffer material may be creased to facilitate attachment to the hive body. These creases also give an angular shape to the awning device which may be ascetically pleasing. The awning device may also be decorated by stenciling or painting for a more pleasing appearance.

Thus the scope of the invention should be determined by the appended claims and their legal equivalents, and not by the examples given.

I claim:

1. A combination beehive and awning device comprising:
a rectangular sheet of flexible material of a predetermined dimension, the rectangular sheet including:
an upper lateral edge along a central portion of the rectangular sheet and having cuts made at two fold junctions;
a front lateral edge opposite the upper lateral edge;
curved side portions;
a beehive having a front upper portion, a hive entrance, and side panels;
wherein the upper lateral edge is bent along a top lateral crease of the rectangular sheet, the top lateral crease extending between the two fold junctions to allow bending along the length of the upper lateral edge to the depth of the cuts, and the upper lateral edge is fastened to the front upper portion of the hive body above the hive entrance; and
wherein each of the curved side portions is bent along a transverse crease of the rectangular sheet, the transverse creases extending between the fold junctions and the front lateral edge, and upper corners of the curved side portions are attached to the side panels of the hive body, giving shape to the awning device, whereby the hive entrance is protected from inclement weather.

2. The combination beehive and awning device of claim 1 wherein the rectangular sheet of flexible material is comprised of semi rigid foam plastic with an additional laminate applied.

3. The combination beehive and awning device of claim 1 wherein the rectangular sheet of flexible material is comprised of opaque or clear plastic or either metal, laminate or fibrous composite.

* * * * *